(12) United States Patent
Syamala et al.

(10) Patent No.: US 10,936,480 B2
(45) Date of Patent: Mar. 2, 2021

(54) MEMORY MANAGEMENT FOR MULTIPLE PROCESS INSTANCES

(71) Applicant: Microsoft Technology Licensing, LLC, Redmond, WA (US)

(72) Inventors: Manoj Syamala, Issaquah, WA (US); Vivek Narasayya, Redmond, WA (US); Junfeng Dong, Sammamish, WA (US); Ajay Kalhan, Redmond, WA (US); Shize Xu, Redmond, WA (US); Changsong Li, Bellevue, WA (US); Pankaj Arora, Sammamish, WA (US); Jiaqi Liu, Bellevue, WA (US); John M. Oslake, Seattle, WA (US); Arnd Christian König, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/428,910

(22) Filed: May 31, 2019

(65) Prior Publication Data

US 2020/0379896 A1    Dec. 3, 2020

(51) Int. Cl.
*G06F 12/00* (2006.01)
*G06F 12/02* (2006.01)
*G06F 12/0882* (2016.01)
*G06F 16/28* (2019.01)

(52) U.S. Cl.
CPC ...... *G06F 12/0238* (2013.01); *G06F 12/0882* (2013.01); *G06F 16/284* (2019.01)

(58) Field of Classification Search
CPC .................................................. G06F 12/0238

USPC ......................................................... 711/103
See application file for complete search history.

(56) References Cited

U.S. PATENT DOCUMENTS

| | | | |
|---|---|---|---|
| 6,877,081 B2* | 4/2005 | Herger | G06F 12/08 710/56 |
| 8,924,677 B2* | 12/2014 | Pronovost | G06F 12/0891 711/166 |
| 9,135,190 B1* | 9/2015 | Bruce | G06F 13/16 |
| 9,229,878 B2* | 1/2016 | Hod | G06F 11/34 |
| 9,256,469 B2* | 2/2016 | Bobroff | G06F 9/45558 |

(Continued)

OTHER PUBLICATIONS

"International Search Report and Written Opinion Issued in PCT Application No. PCT/US2020/026464", dated Jul. 10, 2020, 13 Pages.

*Primary Examiner* — Titus Wong

(57) ABSTRACT

Intelligent memory brokering for multiple process instances, such as relational databases (e.g., SQL servers), reclaims memory based on value, thereby minimizing cost across instances. An exemplary solution includes: based at least on a trigger event, determining a memory profile for each of a plurality of process instances at a computing node; determining an aggregate memory profile, the aggregate memory profile indicating a memory unit cost for each of a plurality of memory units; determining a count of memory units to be reclaimed; identifying, based at least on the aggregate memory profile and the count of memory units to be reclaimed, a count of memory units to be reclaimed within each process instance so that a total cost is minimized to reclaim the determined count; and communicating, to each process instance having identified memory units to be reclaimed, a count of memory units to be reclaimed within the process instance.

20 Claims, 7 Drawing Sheets

(56) References Cited

U.S. PATENT DOCUMENTS

| | | | |
|---|---|---|---|
| 10,289,453 B1 | 5/2019 | Wei et al. | |
| 2004/0181782 A1* | 9/2004 | Findeisen | G06F 12/0253 |
| | | | 717/130 |
| 2005/0232192 A1* | 10/2005 | Rawson, III | G06F 9/5016 |
| | | | 370/329 |
| 2006/0069898 A1* | 3/2006 | Patel | G06F 12/023 |
| | | | 711/171 |
| 2007/0136402 A1* | 6/2007 | Grose | G06F 12/0253 |
| 2010/0199043 A1* | 8/2010 | Sechrest | G06F 12/121 |
| | | | 711/118 |
| 2010/0199063 A1* | 8/2010 | Sechrest | G06F 12/122 |
| | | | 711/204 |
| 2012/0023300 A1* | 1/2012 | Tremaine | G06F 12/1009 |
| | | | 711/162 |
| 2013/0254754 A1* | 9/2013 | Rajaraman | G06F 8/456 |
| | | | 717/149 |
| 2013/0332942 A1* | 12/2013 | Ramesh | G06F 9/542 |
| | | | 719/318 |
| 2013/0339568 A1* | 12/2013 | Corrie | G06F 9/45558 |
| | | | 711/6 |
| 2014/0115260 A1* | 4/2014 | Maybee | G06F 12/123 |
| | | | 711/136 |
| 2015/0161055 A1 | 6/2015 | Deguillard et al. | |
| 2016/0188247 A1* | 6/2016 | Garcia-Arellano | G06F 13/28 |
| | | | 711/173 |
| 2019/0034095 A1 | 1/2019 | Singh et al. | |

\* cited by examiner

MEMORY MANAGEMENT FOR MULTIPLE PROCESS INSTANCES

BACKGROUND

Multi-user services often provide unique instances of processes, such as relational database servers (e.g., structured query language servers), for differing user groups. When the number of instances exceeds the number of computing nodes, at least some of the nodes host multiple instances in a multi-tenant operation. On such nodes, different instances share the node's resources: CPU, memory, input/output (I/O), network access, and others. The performance of certain processes, such as relational database servers and others, can be memory-intensive and depend heavily on the amount of memory that is available for caching. Multiple instances may each attempt to optimize their own individual performance, which can result in inefficiencies.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to a solution for intelligent memory brokering for multiple database process instances, such as relational databases. Exemplary solutions reclaim memory based on value, thereby minimizing cost across instances, globally for the node. An exemplary solution includes: based at least on a trigger event, determining a memory profile for each of a plurality of process instances at a computing node; determining, based at least on the plurality of memory profiles, an aggregate memory profile, the aggregate memory profile indicating a memory unit cost for each of a plurality of memory units; determining a count of memory units to be reclaimed; identifying, based at least on the aggregate memory profile and the count of memory units to be reclaimed, a count of memory units to be reclaimed within each process instance so that a total cost is minimized to reclaim the determined count of memory units to be reclaimed; and communicating, to each process instance having identified memory units to be reclaimed, a count of memory units to be reclaimed within the process instance.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
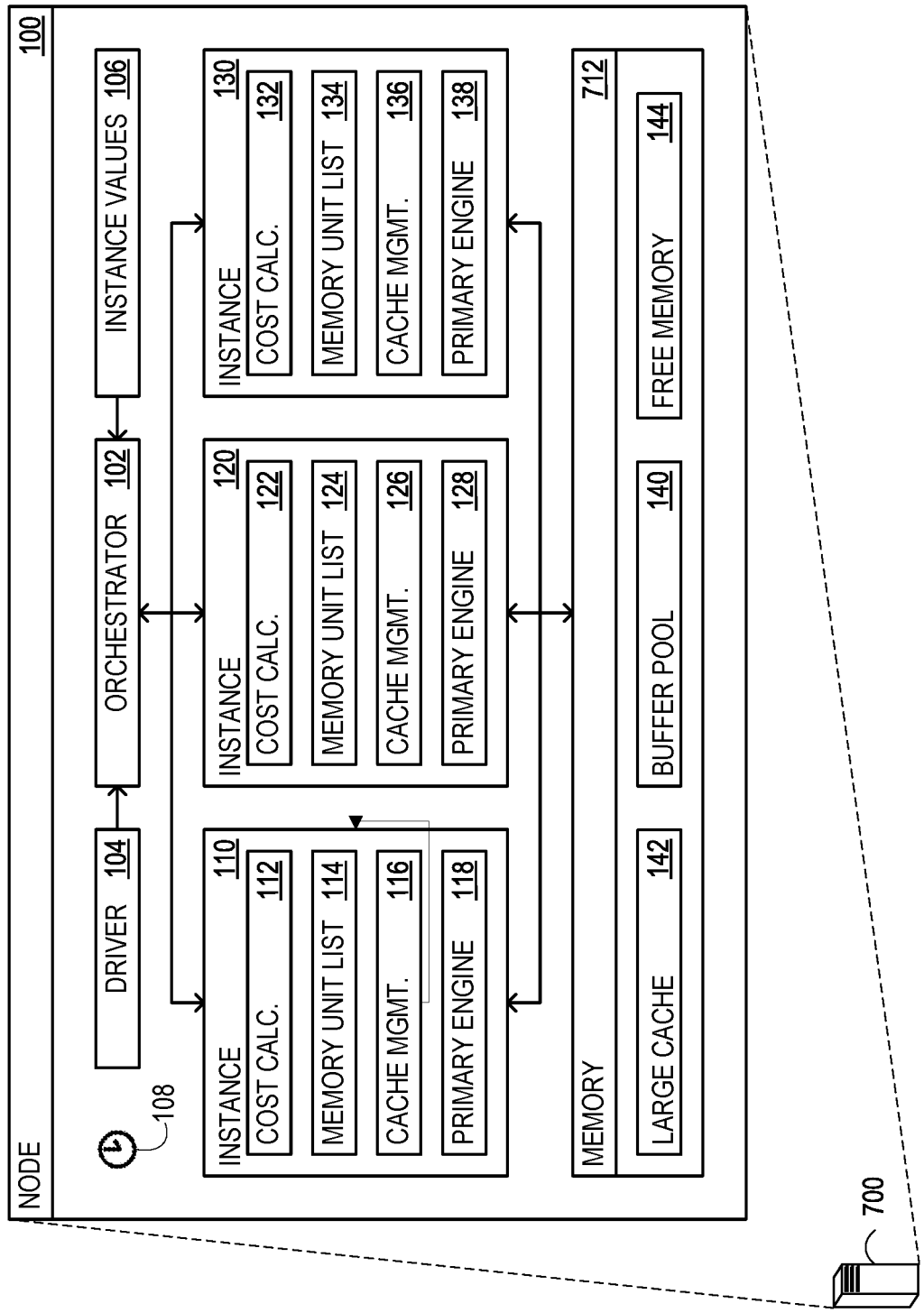
FIG. 1 illustrates an exemplary node that advantageously employs memory management for multiple process instances.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

On a particular computing node, when a resource governance (RG) manager detects node-wide memory pressure, the RG manager attempts to dynamically adjust the job memory limits for all instances on the node, to relieve the pressure. Default schemes include reducing each instance's memory by a fixed amount or a proportional amount. Unfortunately, neither of the default schemes account for differences in the value of memory (VoM) for each instance on the node. This introduces the possibility that some instances could experience a higher impact than others, reducing the global performance for the node.

In contrast, aspects of the disclosure provide intelligent memory brokering for multiple process instances, such as relational databases including structured query language (SQL) servers. Exemplary solutions reclaim memory based on value, thereby minimizing cost across instances, globally for the node. An exemplary solution includes: based at least on a trigger event, determining a memory profile for each of a plurality of process instances at a computing node; determining, based at least on the plurality of memory profiles, an aggregate memory profile, the aggregate memory profile indicating a memory unit cost for each of a plurality of memory units; determining a count of memory units to be reclaimed; identifying, based at least on the aggregate memory profile and the count of memory units to be reclaimed, a count of memory units to be reclaimed within each process instance so that a total cost is minimized to reclaim the determined count of memory units to be reclaimed; and communicating, to each process instance having identified memory units to be reclaimed, a count of memory units to be reclaimed within the process instance.

Aspects of the disclosure operate in an unconventional way to improve multi-instance memory management by minimizing effects of reclaiming memory across multiple instances. The disclosed flexible schemes, optimizing memory management at a level above the instances, can enable a given number of nodes to offer more balanced and reliable performance in a multi-tenant mode of operation. Additionally, aspects of the disclosure reclaim less valuable memory, based upon how the memory is being used, without requiring any modification of the logic within the instances themselves. Aspects of the disclosure are relevant to general multi-tenant node operations (e.g., nodes executing multiple instances of any process), in which memory use can be valued with a cost function, to minimize the loss of value when reclaiming memory.

In some examples, by deriving the VoM for each cache in each of multiple SQL server instances, the resulting memory reconciliation problem is formulated as the task of optimizing aggregate VoM under a constraint on total memory size. This permits reclaiming more memory while mitigating the negative impacts (e.g., the "cost") of reclaiming the memory. Additionally, aspects of the disclosure permit a node to stabilize memory usage relatively quickly, for a given multi-tenant operational profile (e.g., how "hot" certain instances are, based on user employment of those instances).

FIG. 1 illustrates an exemplary node 100 that advantageously employs memory management for multiple process instances. In some examples, at least some of the hardware components for node 100 are provided by one or more computing devices 700 of FIG. 7. Node 100 hosts multiple process instances, instance 110, instance 120, and instance 130 which, in some examples, are database process instances. In some examples, each of the plurality of instances 110, 120, and 130 (process instances) comprises a relational database server process. In some examples, the relational database server processes comprise SQL servers. The primary function of each of instances 110, 120, and 130, such as SQL database operations, are provided by primary engines 118, 128, and 138, respectively.

Node 100 has an orchestrator 102, acting as an RG manager, to broker usage of memory 712. (See FIG. 7 for more detail regarding memory 712.) For illustrative purposes, three portions of memory 712 are indicated, a buffer pool 140, a large cache 142, and free memory 144, although it should be understood that other data and logic described for node 100 also reside within memory 712. Buffer pool 140, large cache 142, and free memory 144 are generally described as "reclaimable memory" because during operation of various process instances on node 100 (e.g., instances 110, 120, and 130), buffer pool 140, large cache 142, and free memory 144 can be allocated and de-allocated for use by the various process instances, to balance the needs of the node and the instances themselves.

A driver 104 defines multiple parameters for operating node 100. These include, in some examples, the number of executing instances (e.g., instances 110, 120, and 130, which, in some examples are SQL servers), the memory usage threshold for each instance at which memory resource governance is triggered, a memory reclaim percentage target to use when the threshold is met, a memory usage check interval, the location of a log file, and other parameters. In some examples, the instance names and working directories are identified within driver 104. When the total committed memory across all instances exceeds the global threshold, driver 104 instructs orchestrator 102 with the number of memory units to reclaim. In some examples, a memory unit is the granularity of the cache (a cache unit), which is given as a page for some arrangements. One common size for a page is 4 kb, although it should be understood that different memory unit sizes are used in some examples. In some examples, driver 104 specifies a memory reset time, measured by a timer 108, after which throttled memory is reset.

Orchestrator 102 is operative to determine a memory profile for each of a plurality of process instances (e.g., instances 110, 120, and 130) at computing node 100, based on a trigger event identified by driver 104. In some examples, the memory profile for each of the plurality of process instances comprises histograms of memory unit costs. In some examples, memory profiles follow a different schema. In some examples, the trigger event is a lapse of a timer countdown. In some examples, the trigger event is the memory usage exceeding a threshold level or available memory falling below a threshold. See FIG. 4 for additional description of a trigger criteria 406. In some examples, the memory unit cost comprises a cost for a cache unit, and in some examples, a cache unit comprises a page. In some examples, the memory profiles for the plurality of process instances indicate memory unit costs for reclaimable memory. In some examples the reclaimable memory comprises buffer pool 140 memory.

Figure 2A:
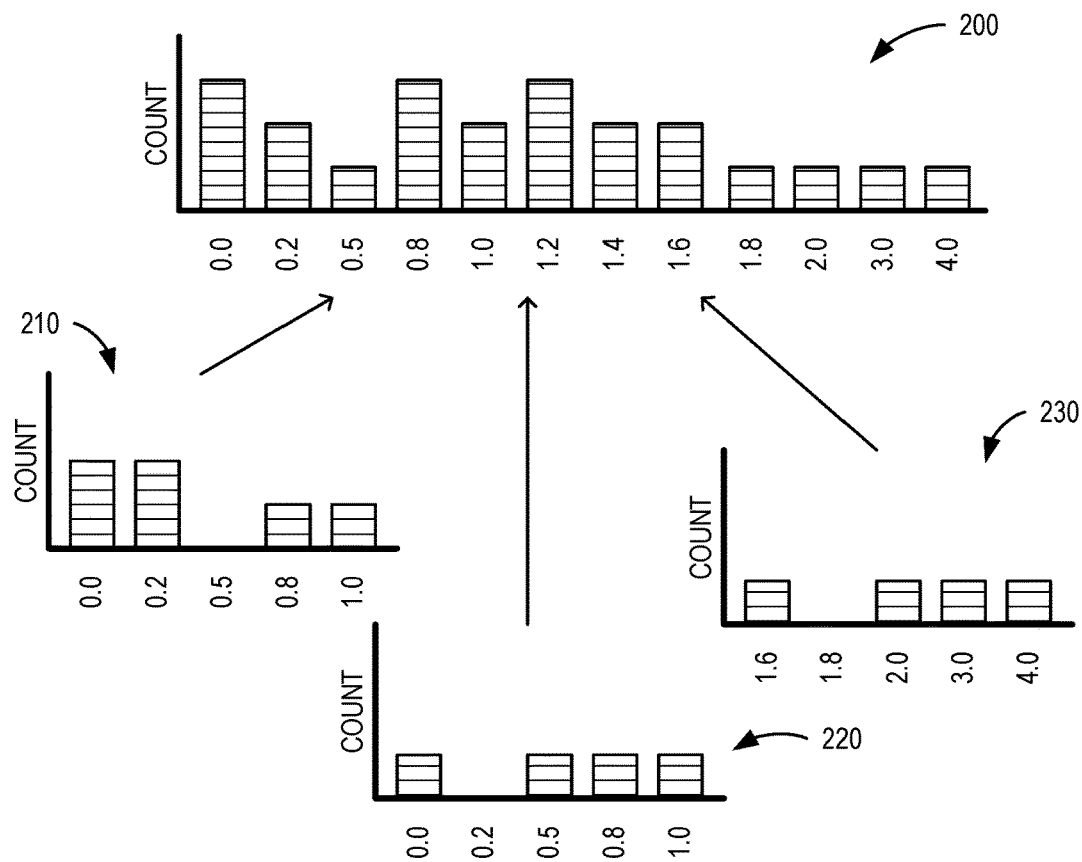
FIG. 2A illustrates exemplary memory profiles, including an exemplary aggregate memory profile.
Figure 2B:
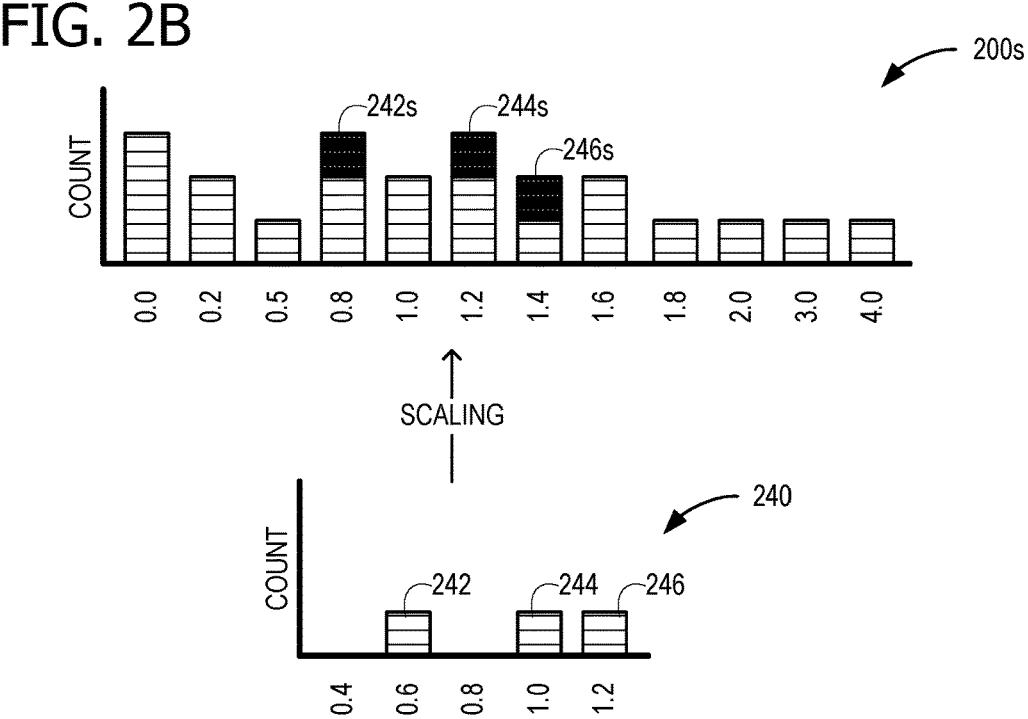
FIG. 2B illustrates scaling of memory unit cost of an exemplary memory profile.

Additional detail for the operation of orchestrator 102 is provided in FIGS. 2A and 2B. Orchestrator 102 determines, based at least on the plurality of memory profiles, an aggregate memory profile 200. Aggregate memory profile 200 indicates a memory unit cost for each of a plurality of memory units. In FIG. 2A, an example form of a memory profile is illustrated graphically as a histogram, although it should be understood that such a graphical depiction is for understanding, and the term "histogram" includes binned data values, whether in ASCII or binary format, without the requirement for a graphical rendering. A memory profile 210 corresponds to instance 110, a memory profile 220 corresponds to instance 120, and a memory profile 230 corresponds to instance 130. As indicated, aggregate memory profile 200 includes the values in each of memory profiles 210, 220, and 230, as well as from other sources, such as additional instances executing on node 100. The illustrated aggregate memory profile 200 comprises a histogram of memory unit costs, although some examples use a different form of memory unit costs. In some examples, memory profiles 210, 220, and 230 contain the cost bins and the number of memory units in each cost bin, without further significant details.

In some examples, each of instances 110, 120 and 130 calculate (e.g., determine) its own memory profile. For example, instance 110 uses cost calculation component 112 to determine memory profile 210; instance 120 uses cost calculation component 122 to determine memory profile 220; and instance 130 uses cost calculation component 132 to determine memory profile 230. In order to perform such calculations, each of instances 110, 120, and 130 track and manage their own cache usage within memory 712 using memory unit lists 114, 124, and 134, respectively. In some examples, calculation of memory unit cost is based at least on historical data, such as the rate at which a memory unit is accessed. A higher rate of access indicates a higher cost to the instance of reclaiming that memory unit. It is preferable to reclaim memory units having lower reclamation cost. Eq. 1 shows an exemplary calculation, although some examples use alternative value formulations:

$$VoM_i = \frac{sts_i \times \lambda_i}{size_i} \quad \text{(Eq. 1)}$$

where $VoM_i$ is the value of memory for memory unit i, $sts_i$ is the system time saved for memory unit i, $\lambda_i$ is the rate (per unit of time) of how often the memory unit i is accessed, and $size_i$ is the size of memory unit i.

The data to perform such calculations is available in telemetry data, in some examples, for one or more of buffer pool 140, large cache 142, and free memory 144. Since the calculated cost is the cost expected if a particular memory unit is no longer within the cache, it is future cache hits that matter. Historical data is used in some examples as a surrogate for cache hit predictions. In some examples, calculation of memory unit cost is based at least on a predictive model (e.g., which includes predictive data or other data upon which cache hit predictions are based), when cache hit predictions are available. It should be understood that the VoM can take multiple varying forms and formulations. For example, the VoM could be defined not only in terms of usage based measures such as described by Eq. (1), but can also be adjusted based on the pricing tier of the database. For example, in one SQL Database service, a database using a more expensive business critical tier may have its cache entries assigned a higher weighted cost than a database using the less expensive general purpose tier. In this example, the base VoM could still be determined by Eq. (1) and then scaled up for the business critical tier, etc. A similar differentiation of cache entry cost could be made between a database in the SQL Database provisioned compute tier as compared to a database in the serverless compute tier.

FIG. 2B illustrates scaling of memory unit cost of an exemplary memory profile 240, to produce aggregate memory profile 200s. In some examples, determining aggregate memory profile 200s comprises scaling, based at least on a value of a process instance, memory unit cost of memory profile 240 for the process instance, referring to the different weights assigned to units of memory for different service level objectives (SLOs). For example, histogram bin 242, corresponding to a value of 0.6 is scaled upward to appear as darkened block 242s in aggregate memory profile 200s at a value of 0.8. Similarly, histogram bin 244, corresponding to a value of 1.0 is scaled upward to appear as darkened block 244s in aggregate memory profile 200s at a value of 1.2, and histogram bin 246, corresponding to a value of 1.2 is scaled upward to appear as darkened block 246s in aggregate memory profile 200s at a value of 1.4. Although this demonstrated a linear additive shift upward by a fixed value (0.2), it should be understood that different scaling schemes may instead be implemented, such as multiplicative, and even scaling downward. Scaling operations are based on relative instance values, identified in instance values 106 of FIG. 1.

Figure 3:
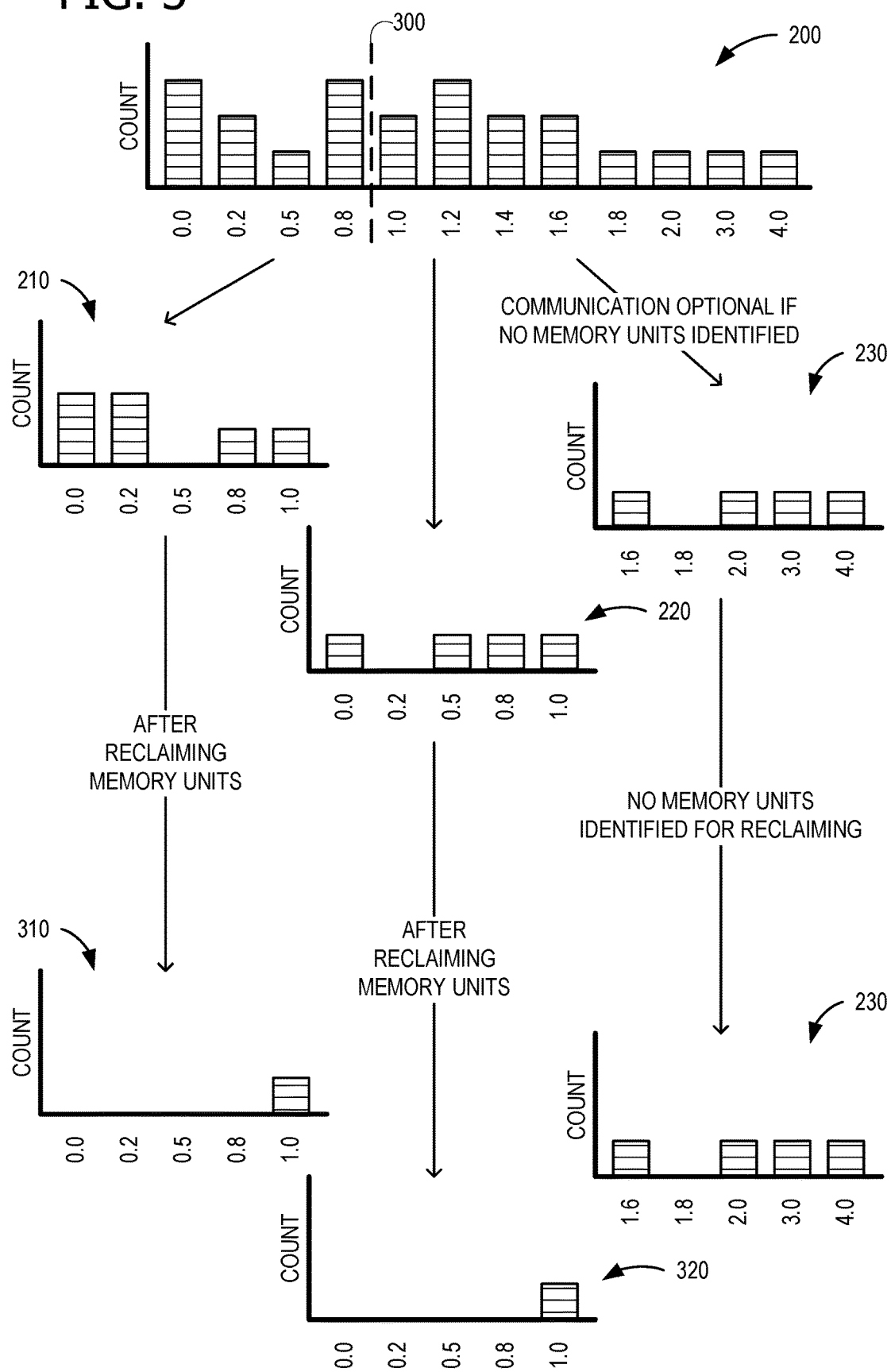
FIG. 3 shows exemplary results of reclaiming memory units.

Orchestrator 102 determines a count of memory units to be reclaimed, in some examples, by receiving the count or a percentage from driver 104. Orchestrator 102 is able to identify, based at least on aggregate memory profile 200 (or aggregate memory profile 200s) and the count of memory units to be reclaimed, a count of memory units to be reclaimed within each process instance so that a total cost (to the node) is minimized to reclaim the determined count of memory units to be reclaimed. For example, orchestrator 102 identifies a target threshold 300, as illustrated in FIG. 3. The count of memory units to the left of target threshold 300 are those that have the lowest relative cost of reclamation (or lowest relative scaled cost). In some examples, these memory units can be identified using data within memory profiles 210, 220, and 230.

Orchestrator 102 communicates, to each process instance having identified memory units to be reclaimed (e.g., instances 110 and 120), the count of memory units to be reclaimed within the process instance. In some examples, orchestrator 102 communicates the count to be reclaimed without specifying the memory units, as each of instances 110 and 120 can identify the affected memory units themselves. In some examples, if memory profiles 210, 220, and 230 contain sufficient detail, orchestrator 102 communicates the identities of the memory units to be reclaimed. This scheme also communicates the counts by merely summing the number of identified memory units. In some examples, communicating the count of memory units to be reclaimed comprises communicating a maximum amount of memory (e.g. memory size or memory unit count) to retain, because communicating the amount to reclaim is a subtraction of the amount to retain from the amount reported. In some examples, orchestrator 102 communicates the count of memory units to be reclaimed within the process instance for all instances, including those not having any memory units identified for reclamation, such as is illustrated for memory profile 230 corresponding to instance 130. Communicating with all instances includes communicating with each process instance having identified memory units to be reclaimed.

Instances 110, 120, and 130 use their own cache management components 116, 126, and 136, respectively to reclaim the identified memory units. In some examples, reclaiming the identified memory units comprises releasing buffer pool 140 memory. In some examples, memory units in large cache 142 and/or free memory 144 are also reclaimed. After reclaiming the identified memory units, the memory profiles may have changed, as also illustrated in FIG. 3. For example, with instance 110, memory profile 210 becomes memory profile 310 after reclaiming identified memory units; with instance 120, memory profile 220 becomes memory profile 312 after reclaiming identified memory units; but with instance 130, memory profile 230 is unaffected. This situation can occur either when instance 130 is making such effective use of cache memory, or the value of instance 300 results in scaling, so that even the lowest cost memory units in memory profile 230 are above target threshold 300. With the operations thus described, orchestrator 102 is able to minimize the total cost to reclaim the determined count of memory units to be reclaimed. In some examples, minimizing the total cost is subject to each process instance (e.g., instances 110, 120, and 130) retaining a minimum amount of cache memory (e.g., minimum memory 412, 422, and 432 of FIG. 4).

Figure 4:
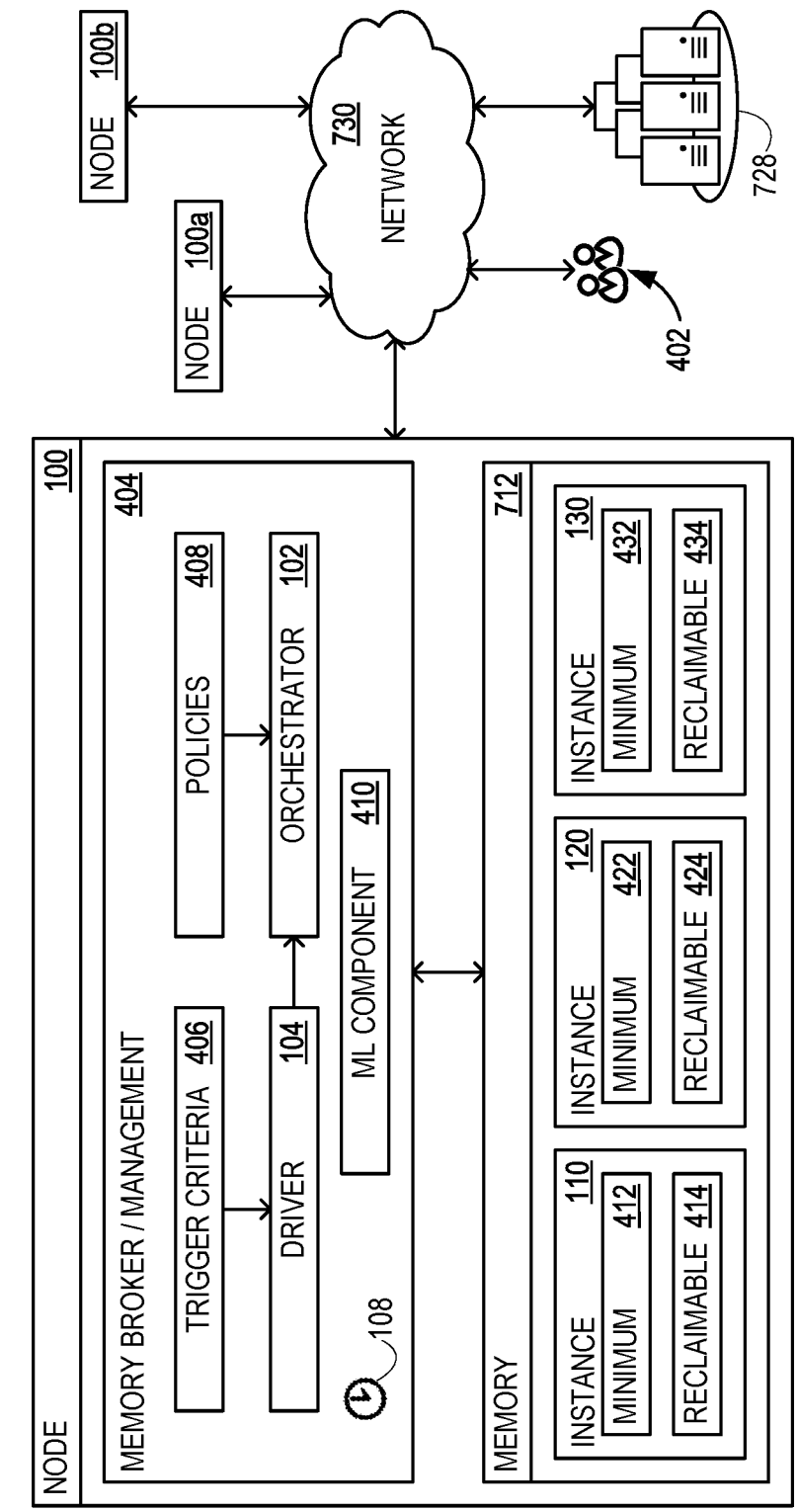
FIG. 4 illustrates another view of the node of FIG. 1, highlighting additional features, along with an exemplary network.

FIG. 4 illustrates another view of node 100, showing some different aspects (than are shown in FIG. 1) for clarity, along with an exemplary network 400. A memory broker component 404 includes orchestrator 102 and driver 104. Trigger criteria 406 specifies when driver 104 instructs orchestrator 102 to begin reclaiming memory. In some examples, trigger criteria is a lapse of a timer countdown, measured by timer 108. In some examples, it is a memory pressure threshold, such as commitment of a certain threshold amount or percentage of memory 712 (or some portion of memory 712) or the availability of remaining memory below a threshold amount or percentage. In some examples, SQL servers require a minimum number of free pages exceed 1024, and failing this requirement can be part of trigger criteria 406. In some examples, the number of free pages is calculated as the total workspace pages committed, subtracting the total pages allocated, and/or by a function MemoryNode::GetTotalPagesFree( ).

Policies 408 provide additional data for operation of orchestrator 102 and driver 104, such as providing information usable to determine instance values 106 (of FIG. 1). In some examples, premium instances demanding higher subscription rates (e.g., based on SLOs or other priority information) are identified for scaling up. In some examples, policies 408 provides guidance on reclaiming memory, such as by specifying alternative methods for identifying memory units to reclaim. In general policies 408 contain supplemental rules that affect the relative trimming of each of instances 110, 120, and 130.

A machine learning (ML) component 410 provides ML or artificial intelligence (AI) capabilities (together "ML") for various examples. In some examples, ML component 410 is accessible by instances 110, 120, and 130 for predicting cache hits so that instances 110, 120, and 130 can calculate memory unit cost based at least on a predictive model determined by ML. The memory usage pattern for some databases could be repeating. A workload example of this could be a database that runs a batch job on a fixed schedule for a fixed period of time and is otherwise idle. The service can identify databases with such periodic usage patterns and parameterize a time series predictor of their memory usage. Suppose memory reclamation on a machine across multiple SQL instances is triggered at time T. Further suppose some of these SQL instances have a time series predictor and the prediction is sufficiently low over a sufficiently long time interval starting at time T. Then for such databases their memory cache value can be adjusted lower.

For example, for such databases, $\lambda_i$ (the parameter for the cache entry access frequency in the VoM heuristic of Eq. (1)) could be a function that predicts cache access frequency over a future prescribed time interval rather than be calculated as a constant value over an arbitrary time interval. In the batch job example, if multi-instance reclamation occurred at time T and the batch job stopped at time T or shortly before T, then using the predicted lower value of lambda for that database would increase the bias in its memory being reclaimed and in so doing reduce the overall impact of memory reclamation across the machine.

FIG. 4 illustrates instances 110, 120, and 130 as within memory 712, and including minimum memory 412, 422, and 432, respectively. Minimum memory 412, 422, and 432 represent a minimum amount of memory to be used by instances 110, 120, and 130 as specified by driver 104, below which instability may be exhibited for instances 110, 120, and 130. In some examples, minimum memory 412, 422, and 432 is 3 Gb or 4 Gb. Reclaimable memory 414, 424, and 434 represent memory that can be reclaimed from each of instances 110, 120, and 130, using the procedures described herein.

Node 100 is connected to additional nodes 100a and 100b, having similar structure and operations as described for node 100, via a network 730. Node 100 is also connected to a cloud resource 728 via network 730, for example, to input and output data or for other services. User groups 402 can access instances 110, 120, and 130 in node 100 via network 730, for example, to perform database operations and otherwise advantageously employ the functional utility of primary engines 118, 128, and 138.

An example of building a memory profile histogram is given by the following pseudocode:

```
struct DynInterval
{
SEListElem link;
// The cost representing the end of the interval
//
double end;
// The number of pages of memory contained in this
    Interval
//
double sumSize;
// The highest cost entry in the interval
//
double max;
// Number of entries in the interval
//
double numEntries;
// The amount of pages of memory accumulated in this
    Interval since the
// the last time the interval was split
//
double sumLastSplit;
// The number of entries added to this interval since the
    last time the
// interval was split
//
double numEntriesLastSplit;
};
```

An example of building a cost model for a buffer pool is given by the following pseudocode:

```
Calculate the maxSamplingPages with respect to the job
    memory limit;
Let intervalList be the cost histogram;
Let initialIntervalCount be the max number of the first set
    of intervals;
Randomly iterate through the buffer pages until maxSam-
    plingPages or no more pages—for each page, do
{
    Calculate the currentPageCost as the read I/O time
        multiplied by the reuse probability;
    Linear search through the ordered histogram intervals
        to find a prevInterval whose end is less than or equal
        to the currentPageCost;
    Set previnterval→end to currentPageCost;
    If initialIntervalCount is less than the count of inter-
        valList, create a newInterval and insert it after pre-
        vinterval
    {
        Set newInterval→end to currentPageCost;
        Set newInterval→sumSize to 1;
        Set newInterval→max to currentPagecost;
        Set newInterval→numEntries to 1;
        Set newInterval→numEntriesLastSplit to 1;
        Set newInterval→sumLastSplit to currentPageCost;
    }
    Otherwise, let currentInterval be prevInterval. Add the
        current page info to the currentInterval
    {
        Increment currentInterval→numEntries;
        Increment currentInterval→numEntriesLastSplit;
        currentinterval→sumLastSplit+=currentPageCost;
        currentInterval→sumSize+=1.0;
        currentInterval→max=max(interval→max, current-
            PageCost);
        Split the curentInterval to two if the current interval
            contains more than THRESHOLD_FOR_SPLIT-
            TING percentage of the entries sampled so far;
    }
}
Let scaleFactor be the total number of buffer pages
    divided by numberSampledPages; Iterate each interval
    in intervalList, for each interval scale up its sumSize by
    scaleFactor;
```

An example of identifying a count of memory units to be reclaimed is given by the following pseudocode:

```
Let histogramList be a list of histograms for all the SQL
    instances, where histogramList[i] stands for the histo-
    gram for SQL instance i;
Let remainingTarget be the ReclaimTarget;
Let countInstances be the count of SQL instances;
Let reclaimTargetList be a list of reclaim targets for all
    SQL instances;
```

Figure 5:
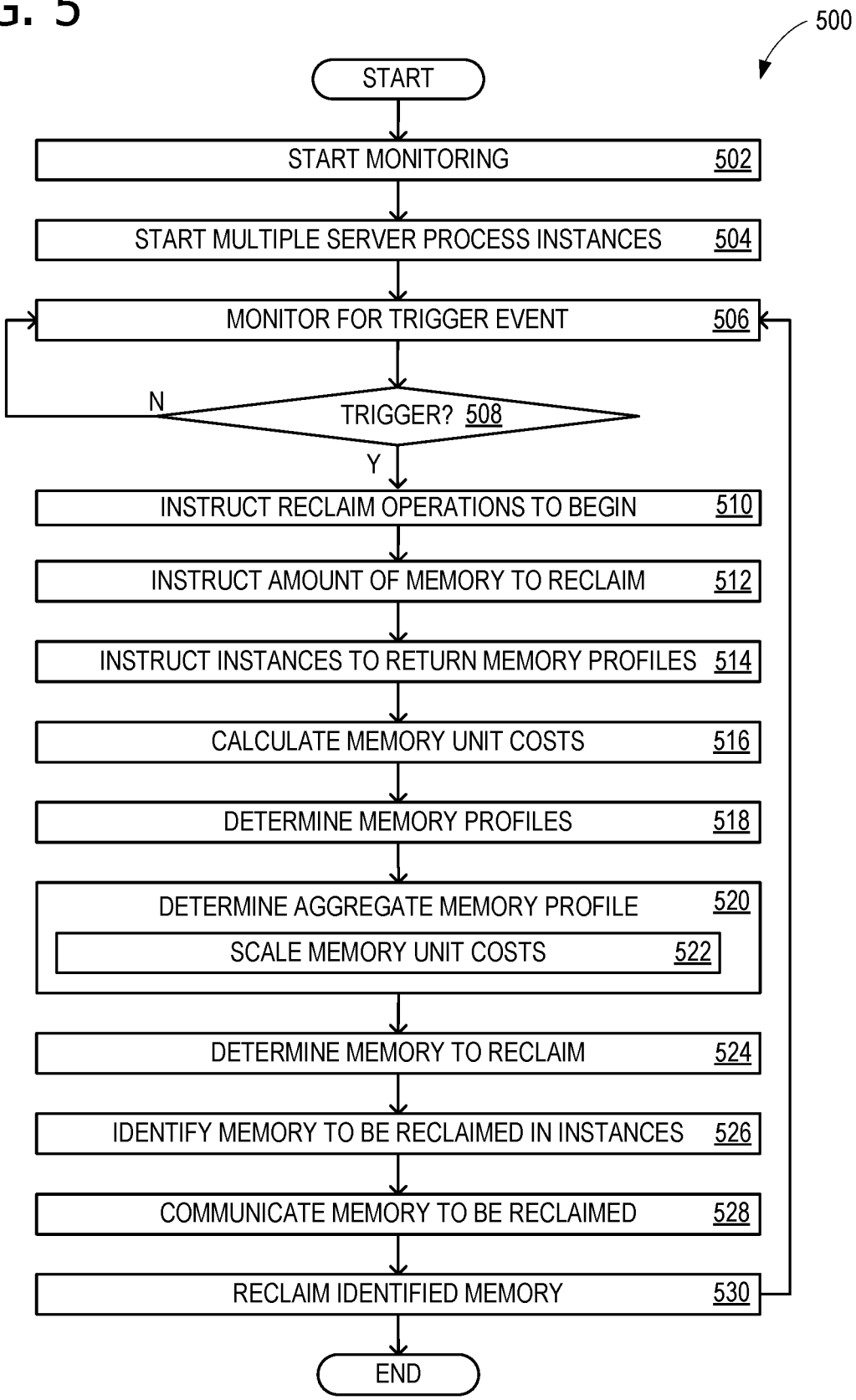
FIG. 5 is a flow chart illustrating exemplary operations involved in intelligent configuration management of user devices.

Let intervals be an array of pointers to DynInterval and its size is countInstances, where intervals[i] stands the current interval for the histogram for SQL instance i;
Initialize each pointer interval[i] in intervals to the first interval of the histogramList[i] for the corresponding SQL instance;
Loop
{
  Iterate through all intervals to find the interval with the smallest right endpoint in the current iteration. If no more interval left, exit from the loop;
  Let smallest be the index to the interval with the smallest right endpoint;
  If remainingTarget is greater than the number of pages (sumSize) in intervals[smallest], the interval with the smallest right endpoint so far, increment reclaimTargetList[smallest] by sunSize;
  Otherwise, increment reclaimTargetList[smallest] by remainingTaget and exit from the loop;
  Set intervals[smallest] to the next interval in the histogram;
}
Output reclaimTargetList;

FIG. 5 is a flow chart 500 illustrating exemplary operations involved in memory management for multiple process instances. In some examples, operations described for flow chart 500 are performed by computing device 700 of FIG. 7. Flow chart 500 commences with operation 502 starting to monitor memory commitment and/or availability on a node. Multiple process instances, such as multiple SQL servers, are started on the node in operation 504. Operation 506 is ongoing monitoring for a trigger event, such as a timer countdown and/or a memory usage or availability threshold being met. Decision operation 508 identifies whether the trigger event has occurred, and if not, flow chart 500 returns to operation 506.

Upon the trigger event, a driver instructs an orchestrator (RG manager), in operation 510, to begin reclamation operations. In some examples, the driver also instructs the orchestrator, in operation 512, the amount of memory to reclaim, such as by specifying the maximum memory to use (by amount or percentage), the maximum memory for each instance to use, the minimum amount of memory to reclaim (amount or percentage), or some other value. In operation 514, the orchestrator instructs the instances to provide memory profiles. The memory unit costs are calculated in operation 516. In some examples, this includes calculating memory unit cost based at least on historical data. In some examples, this includes calculating memory unit cost based at least on a predictive model. In some examples, each instance calculates and returns its own memory profile histogram.

Memory profiles are determined, for each instance, in operation 518 by using the calculated memory unit costs. In some examples, this involved binning the costs into buckets to form histogram (which includes the bin and count data, and does not require graphical depiction). That is, operation 518 includes, based at least on a trigger event, determining a memory profile for each of a plurality of process instances at a computing node. In some examples, each of the plurality of process instances comprises a relational database server process. In some examples, the relational database server processes comprise SQL servers. In some examples, the memory profile for each of the plurality of process instances comprises histograms of memory unit costs. In some examples, the memory unit cost comprises a cost for a cache unit. In some examples, a cache unit comprises a page. In some examples, the memory profiles for the plurality of process instances indicate memory unit costs for reclaimable memory. Various types of database caches are considered in the reclaim policy. For example, the reclaimable memory comprises buffer pool memory, large cache (e.g., for column store indexes), user cache, object cache and its instantiations, free pages, and/or a query plan cache. The policy allows the service to choose the kinds of caches that are subject to the memory reclamation scheme. In some examples, the disclosure is operable with a combined large cache histogram, hence the source of reclaimable memory is more general than a buffer pool but more narrow than any memory source.

Operation 520 includes determining, based at least on the plurality of memory profiles, an aggregate memory profile, the aggregate memory profile indicating a memory unit cost for each of a plurality of memory units. In some examples, operation 520 includes operation 522 for scaling, based at least on a value of a process instance, memory unit cost of the memory profile for the process instance. In this manner, in some examples, the orchestrator creates a global histogram of reclaimable memory unit costs for the node. Operation 524 includes determining a count of memory units to be reclaimed. In some examples, the orchestrator uses instructions from the driver, received in operation 512. In some examples, the orchestrator makes its own determination.

Operation 526 includes identifying, based at least on the aggregate memory profile and the count of memory units to be reclaimed, a count of memory units to be reclaimed within each process instance so that a total cost is minimized to reclaim the determined count. In some examples, minimizing the total cost to reclaim the determined count comprises minimizing the total cost subject to each process instance retaining a minimum amount of cache memory. In some examples, the orchestrator determines the histogram bucket to use as a cut-off point for reclaiming pages of cache memory. Operation 528 includes communicating, to each process instance having identified memory units to be reclaimed, a count of memory units to be reclaimed within the process instance. In some examples, communicating the count of memory units to be reclaimed comprises communicating a maximum amount of memory to retain.

Operation 530 includes reclaiming the identified memory units. In some examples, reclaiming the identified memory units comprises releasing reclaimable memory. In some examples, reclaiming the identified memory units comprises releasing large cache memory. In some examples, reclaiming the identified memory units comprises releasing free memory. In some examples two or more of buffer pool large cache, and free memory are released.

Figure 6:
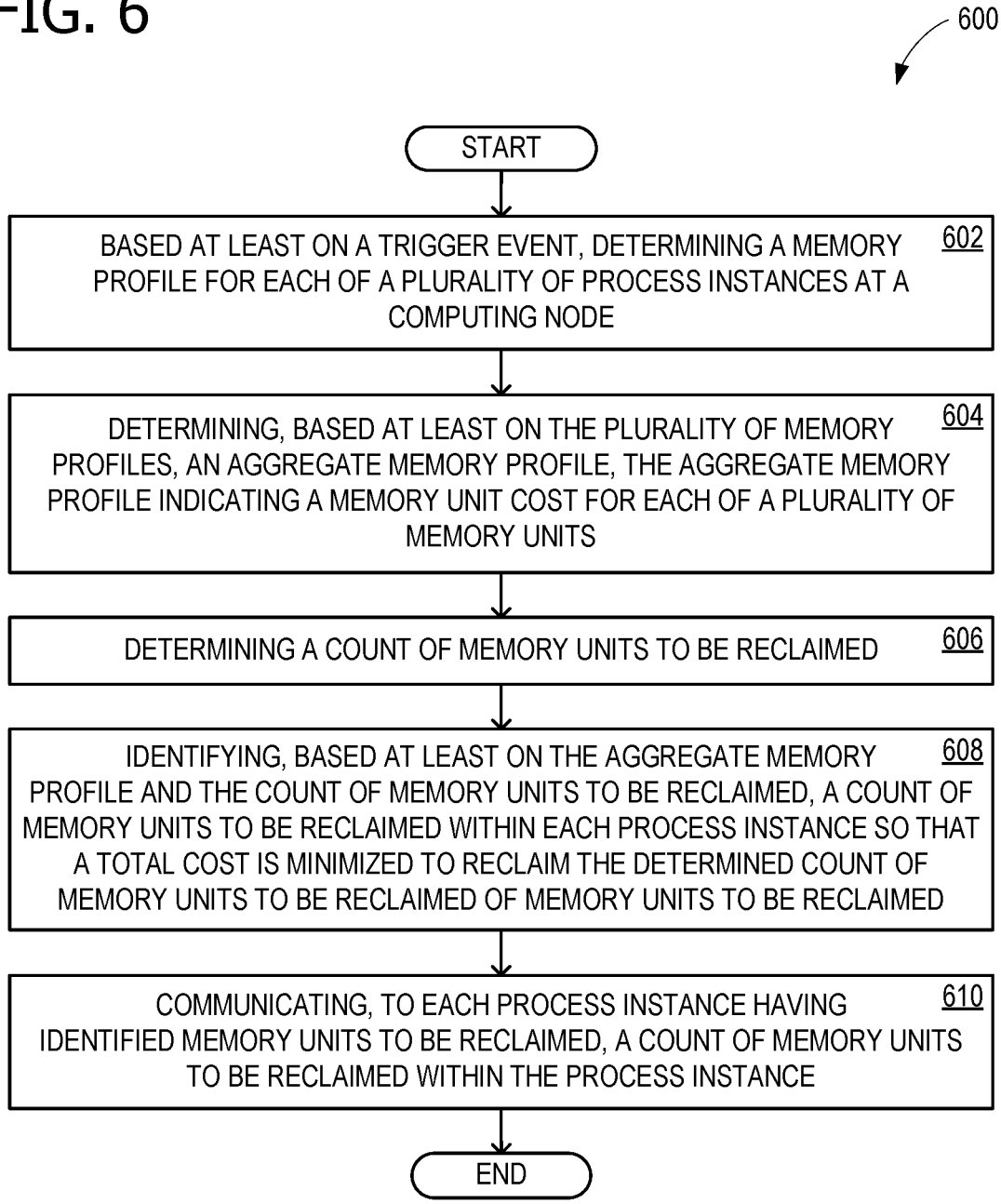
FIG. 6 is another flow chart illustrating exemplary operations involved in intelligent configuration management of user devices.

FIG. 6 is a flow chart 600 illustrating exemplary operations involved in memory management for multiple process instances. In some examples, operations described for flow chart 600 are performed by computing device 700 of FIG. 7. Flow chart 600 commences with operation 602, which includes based at least on a trigger event, determining a memory profile for each of a plurality of process instances at a computing node. In some examples, each of the plurality of process instances comprises a relational database server process. In some examples, the relational database server processes comprise SQL servers. In some examples, the memory profile for each of the plurality of process instances comprises histograms of memory unit costs. In some examples, the memory unit cost comprises a cost for a cache unit. In some examples, a cache unit comprises a page. In some examples, the memory profiles for the plurality of process instances indicate memory unit costs for reclaimable memory. In some examples, the reclaimable memory comprises buffer pool memory.

Operation 604 includes determining, based at least on the plurality of memory profiles, an aggregate memory profile, the aggregate memory profile indicating a memory unit cost for each of a plurality of memory units. In some examples, determining the aggregate memory profile comprises scaling, based at least on a value of a process instance, memory unit cost of the memory profile for the process instance. Operation 606 includes determining a count of memory units to be reclaimed. In some examples, the aggregate memory profile comprises a histogram of memory unit costs. Operation 608 includes identifying, based at least on the aggregate memory profile and the count of memory units to be reclaimed, a count of memory units to be reclaimed within each process instance so that a total cost is minimized to reclaim the determined count of memory units to be reclaimed.

In some examples, minimizing the total cost to reclaim the determined count comprises minimizing the total cost subject to each process instance retaining a minimum amount of cache memory. Operation 610 includes communicating, to each process instance having identified memory units to be reclaimed, a count of memory units to be reclaimed within the process instance. In some examples, communicating the count of memory units to be reclaimed comprises communicating a maximum amount of memory to retain.

Additional Examples

Some aspects and examples disclosed herein are directed to a system for memory management for multiple process instances comprising: a processor; and a computer-readable medium storing instructions that are operative when executed by the processor to: based at least on a trigger event, determine a memory profile for each of a plurality of process instances at a computing node; determine, based at least on the plurality of memory profiles, an aggregate memory profile, the aggregate memory profile indicating a memory unit cost for each of a plurality of memory units; determine a count of memory units to be reclaimed; identify, based at least on the aggregate memory profile and the count of memory units to be reclaimed, a count of memory units to be reclaimed within each process instance so that a total cost is minimized to reclaim the determined count of memory units to be reclaimed; and communicate, to each process instance having identified memory units to be reclaimed, a count of memory units to be reclaimed within the process instance.

Additional aspects and examples disclosed herein are directed to a method of memory management for multiple process instances comprising: based at least on a trigger event, determining a memory profile for each of a plurality of process instances at a computing node; determining, based at least on the plurality of memory profiles, an aggregate memory profile, the aggregate memory profile indicating a memory unit cost for each of a plurality of memory units; determining a count of memory units to be reclaimed; identifying, based at least on the aggregate memory profile and the count of memory units to be reclaimed, a count of memory units to be reclaimed within each process instance so that a total cost is minimized to reclaim the determined count of memory units to be reclaimed; and communicating, to each process instance having identified memory units to be reclaimed, a count of memory units to be reclaimed within the process instance.

Additional aspects and examples disclosed herein are directed to one or more computer storage devices having computer-executable instructions stored thereon for memory management for multiple relational database server process instances, which, on execution by a computer, cause the computer to perform operations comprising: based at least on a trigger event, requesting a memory profile from each of a plurality of process instances at a computing node, wherein each of the plurality of process instances comprises a relational database server process; for each process instance in the plurality of process instances, calculating memory unit cost based at least on historical data, predictive data, or both; receiving the plurality of memory profiles from the plurality of process instances; determining, based at least on the plurality of memory profiles, an aggregate memory profile, the aggregate memory profile indicating a memory unit cost for each of a plurality of memory units, wherein determining the aggregate memory profile comprises scaling, based at least on a value of a process instance, a memory unit cost of the memory profile for the process instance, wherein the aggregate memory profile comprises a histogram of memory unit costs, wherein the memory profile for each of the plurality of process instances comprises histograms of memory unit costs, wherein the memory unit cost comprises a cost for a cache unit, wherein a cache unit comprises a page, wherein the memory profiles for the plurality of process instances indicate memory unit costs for reclaimable memory, and wherein the reclaimable memory comprises buffer pool memory; determining a count of memory units to be reclaimed; identifying, based at least on the aggregate memory profile and the count of memory units to be reclaimed, a count of memory units to be reclaimed within each process instance so that a total cost is minimized to reclaim the determined count of memory units to be reclaimed; communicating, to each process instance having identified memory units to be reclaimed, a count of memory units to be reclaimed within the process instance; and reclaiming the identified memory units, wherein reclaiming the identified memory units comprises releasing buffer pool memory.

Alternatively, or in addition to the other examples described herein, examples include any combination of the following:
- each of the plurality of process instances comprises a relational database server process;
- the relational database server processes comprise SQL servers;
- determining the aggregate memory profile comprises scaling, based at least on a value of a process instance, memory unit cost of the memory profile for the process instance;
- the aggregate memory profile comprises a histogram of memory unit costs;
- the memory profile for each of the plurality of process instances comprises histograms of memory unit costs;
- the memory unit cost comprises a cost for a cache unit;
- a cache unit comprises a page;
- the memory profiles for the plurality of process instances indicate memory unit costs for reclaimable memory;
- the reclaimable memory comprises buffer pool memory;
- reclaiming the identified memory units
- reclaiming the identified memory units comprises releasing buffer pool memory;
- reclaiming the identified memory units comprises releasing free memory;
- reclaiming the identified memory units comprises releasing large cache memory;

calculating memory unit cost based at least on historical data;

calculating memory unit cost based at least on a predictive model;

communicating the count of memory units to be reclaimed comprises communicating a maximum amount of memory to retain; and minimizing the total cost to reclaim the determined count comprises minimizing the total cost subject to each process instance retaining a minimum amount of cache memory.

While the aspects of the disclosure have been described in terms of various examples with their associated operations, a person skilled in the art would appreciate that a combination of operations from any number of different examples is also within scope of the aspects of the disclosure.

Example Operating Environment

Figure 7:
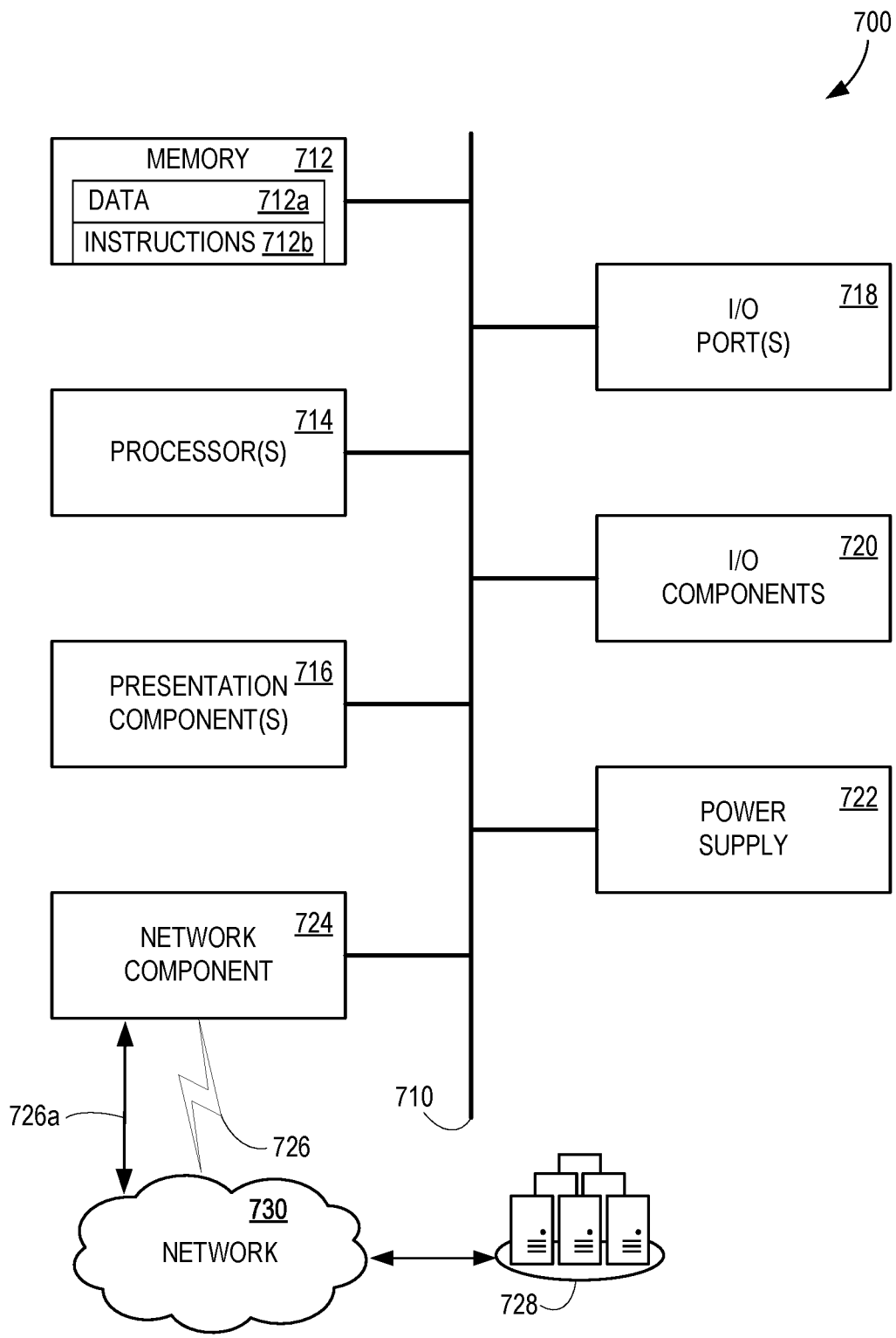
FIG. 7 is a block diagram of an example computing environment suitable for implementing some of the various examples disclosed herein.

FIG. 7 is a block diagram of an example computing device 700 for implementing aspects disclosed herein, and is designated generally as computing device 700. Computing device 700 is but one example of a suitable computing environment and is not intended to suggest any limitation as to the scope of use or functionality of the examples disclosed herein. Neither should computing device 700 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 700 includes a bus 710 that directly or indirectly couples the following devices: computer-storage memory 712, one or more processors 714, one or more presentation components 716, I/O ports 718, I/O components 720, a power supply 722, and a network component 724. While computing device 700 is depicted as a seemingly single device, multiple computing devices 700 may work together and share the depicted device resources. For example, memory 712 may be distributed across multiple devices, and processor(s) 714 may be housed with different devices.

Bus 710 represents what may be one or more busses (such as an address bus, data bus, or a combination thereof). Although the various blocks of FIG. 7 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 7 and the references herein to a "computing device." Memory 712 may take the form of the computer-storage media references below and operatively provide storage of computer-readable instructions, data structures, program modules and other data for the computing device 700. In some examples, memory 712 stores one or more of an operating system, a universal application platform, or other program modules and program data. Memory 712 is thus able to store and access data 712a and instructions 712b that are executable by processor 714 and configured to carry out the various operations disclosed herein.

In some examples, memory 712 includes computer-storage media in the form of volatile and/or nonvolatile memory, removable or non-removable memory, data disks in virtual environments, or a combination thereof. Memory 712 may include any quantity of memory associated with or accessible by the computing device 700. Memory 712 may be internal to the computing device 700 (as shown in FIG. 7), external to the computing device 700 (not shown), or both (not shown). Examples of memory 712 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 700. Additionally, or alternatively, the memory 712 may be distributed across multiple computing devices 700, for example, in a virtualized environment in which instruction processing is carried out on multiple devices 700. For the purposes of this disclosure, "computer storage media," "computer-storage memory," "memory," and "memory devices" are synonymous terms for the computer-storage memory 712, and none of these terms include carrier waves or propagating signaling.

Processor(s) 714 may include any quantity of processing units that read data from various entities, such as memory 712 or I/O components 720. Specifically, processor(s) 714 are programmed to execute computer-executable instructions for implementing aspects of the disclosure. The instructions may be performed by the processor, by multiple processors within the computing device 700, or by a processor external to the client computing device 700. In some examples, the processor(s) 714 are programmed to execute instructions such as those illustrated in the flow charts discussed below and depicted in the accompanying drawings. Moreover, in some examples, the processor(s) 714 represent an implementation of analog techniques to perform the operations described herein. For example, the operations may be performed by an analog client computing device 700 and/or a digital client computing device 700. Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 700, across a wired connection, or in other ways. I/O ports 718 allow computing device 700 to be logically coupled to other devices including I/O components 720, some of which may be built in. Example I/O components 720 include, for example but without limitation, a microphone, joystick, game pad, satellite dish, scanner, printer, wireless device, etc.

The computing device 700 may operate in a networked environment via the network component 724 using logical connections to one or more remote computers. In some examples, the network component 724 includes a network interface card and/or computer-executable instructions (e.g., a driver) for operating the network interface card. Communication between the computing device 700 and other devices may occur using any protocol or mechanism over any wired or wireless connection. In some examples, network component 724 is operable to communicate data over public, private, or hybrid (public and private) using a transfer protocol, between devices wirelessly using short range communication technologies (e.g., near-field communication (NFC), BLUETOOTH® communications, or the like), or a combination thereof. Network component 724 communicates over wireless communication link 726 and/or a wired communication link 726a to a cloud resource 728 across network 730. Various different examples of communication links 726 and 726a include a wireless connection, a wired connection, and/or a dedicated link, and in some examples, at least a portion is routed through the internet.

Although described in connection with an example computing device 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for memory management for multiple database process instances, the system comprising:
   a processor; and
   a computer-readable medium storing instructions that are operative when executed by the processor to:
      determine a memory profile for each of the plurality of process instances at a computing node, wherein each of the plurality of process instances comprises a relational database server process;
      determine, based at least on the plurality of memory profiles, an aggregate memory profile, the aggregate memory profile indicating a memory unit cost for each of a plurality of memory units, the memory unit cost being calculated based, in part, on a rate of how often a memory unit is accessed per unit of time (λ);

determine a count of memory units to be reclaimed;

identify, based at least on the aggregate memory profile and the count of memory units to be reclaimed, a count of memory units to be reclaimed within each process instance so that a total cost is minimized to reclaim the determined count of memory units to be reclaimed;

communicate, to each process instance having identified memory units to be reclaimed, a count of memory units to be reclaimed within the process instance; and reclaim the identified memory units, wherein reclaiming the identified memory units comprises releasing reclaimable memory.

2. The system of claim 1, wherein the relational database server processes comprise structured query language (SQL) servers.

3. The system of claim 1, wherein determining the aggregate memory profile comprises scaling, based at least on a value of a process instance, memory unit cost of the memory profile for the process instance.

4. The system of claim 1, wherein the aggregate memory profile comprises a histogram of memory unit costs, and wherein the memory profile for each of the plurality of process instances comprises histograms of memory unit costs.

5. The system of claim 1, wherein the memory unit cost comprises a cost for a cache unit, and wherein a cache unit comprises a page.

6. The system of claim 1, wherein the memory profiles for the plurality of process instances indicate memory unit costs for reclaimable memory, and wherein the reclaimable memory comprises buffer pool memory.

7. The system of claim 1, wherein the instructions are further operative to calculate memory unit cost based at least on a predictive model.

8. The system of claim 1, wherein the instructions are further operative to calculate memory unit cost based at least on historical data.

9. The system of claim 1, wherein communicating the count of memory units to be reclaimed comprises communicating a maximum amount of memory to retain.

10. A method of memory management for multiple database process instances, the method comprising:

determining a memory profile for each of the plurality of process instances at a computing node, wherein each of the plurality of process instances comprises a relational database server process;

determining, based at least on the plurality of memory profiles, an aggregate memory profile, the aggregate memory profile indicating a memory unit cost for each of a plurality of memory units, the memory unit cost being calculated based, in part, on how often a memory unit is accessed per unit of time (λ);

determining a count of memory units to be reclaimed;

identifying, based at least on the aggregate memory profile and the count of memory units to be reclaimed, a count of memory units to be reclaimed within each process instance so that a total cost is minimized to reclaim the determined count of memory units to be reclaimed; and communicating, to each process instance having identified memory units to be reclaimed, a count of memory units to be reclaimed within the process instance.

11. The method of claim 10, wherein the relational database server processes comprise SQL servers.

12. The method of claim 10, wherein determining the aggregate memory profile comprises scaling, based at least on a value of a process instance, a memory unit cost of the memory profile for the process instance.

13. The method of claim 10, wherein the aggregate memory profile comprises a histogram of memory unit costs, and wherein the memory profile for each of the plurality of process instances comprises histograms of memory unit costs.

14. The method of claim 10, wherein the memory unit cost comprises a cost for a cache unit, and wherein a cache unit comprises a page.

15. The method of claim 10, wherein the memory profiles for the plurality of process instances indicate memory unit costs for reclaimable memory, and wherein the reclaimable memory comprises buffer pool memory.

16. The method of claim 10, further comprising:

reclaiming the identified memory units, wherein reclaiming the identified memory units comprises releasing buffer pool memory.

17. The method of claim 10, further comprising:

calculating memory unit cost based at least on historical data; or calculating memory unit cost based at least on a predictive model.

18. The method of claim 10, wherein communicating the count of memory units to be reclaimed comprises communicating a maximum amount of memory to retain.

19. One or more computer storage devices having computer-executable instructions stored thereon for memory management for multiple relational database server process instances, which, on execution by a computer, cause the computer to perform operations comprising:

requesting a memory profile from each of a plurality of process instances at a computing node, wherein each of the plurality of process instances comprises a relational database server process;

for each process instance in the plurality of process instances, calculating memory unit cost based at least on historical data, predictive data, or both;

receiving the plurality of memory profiles from the plurality of process instances;

determining, based at least on the plurality of memory profiles, an aggregate memory profile, the aggregate memory profile indicating a memory unit cost for each of a plurality of memory units, wherein determining the aggregate memory profile comprises the memory unit cost being calculated based, in part, on how often a memory unit is accessed per unit of time (λ);

determining a count of memory units to be reclaimed;

identifying, based at least on the aggregate memory profile and the count of memory units to be reclaimed, a count of memory units to be reclaimed within each process instance so that a total cost is minimized to reclaim the determined count; and communicating, to each process instance having identified memory units to be reclaimed, a count of memory units to be reclaimed within the process instance.

20. The one or more computer storage devices of claim 19, further comprising scaling, based at least on a value of a process instance, a memory unit cost of the memory profile for the process instance, wherein the aggregate memory profile comprises a histogram of memory unit costs, wherein the memory profile for each of the plurality of process instances comprises histograms of memory unit costs, wherein the memory unit cost comprises a cost for a cache unit, wherein a cache unit comprises a page, wherein the memory profiles for the plurality of process instances indicate memory unit costs for reclaimable memory, and wherein the reclaimable memory comprises buffer pool memory.

\* \* \* \* \*